(12) United States Patent
Johnson

(10) Patent No.: US 12,502,287 B2
(45) Date of Patent: Dec. 23, 2025

(54) ARTIFICIAL KNEE AND PROSTHETIC ASSEMBLY KIT THEREFOR

(71) Applicant: Phillip W. Johnson, Narrows, VA (US)

(72) Inventor: Phillip W. Johnson, Narrows, VA (US)

(*) Notice: Subject to any disclaimer, the term of this patent is extended or adjusted under 35 U.S.C. 154(b) by 848 days.

(21) Appl. No.: 17/809,787

(22) Filed: Jun. 29, 2022

(65) Prior Publication Data

US 2022/0331128 A1    Oct. 20, 2022

Related U.S. Application Data

(63) Continuation-in-part of application No. 16/678,919, filed on Nov. 8, 2019, now Pat. No. 11,419,730.

(60) Provisional application No. 63/264,440, filed on Nov. 23, 2021, provisional application No. 62/758,478, filed on Nov. 9, 2018.

(51) Int. Cl.
*A61F 2/64* (2006.01)
*A61F 2/80* (2006.01)
*A61F 2/30* (2006.01)

(52) U.S. Cl.
CPC .............. *A61F 2/64* (2013.01); *A61F 2/80* (2013.01); *A61F 2002/30492* (2013.01); *A61F 2002/30563* (2013.01); *A61F 2220/0041* (2013.01)

(58) Field of Classification Search
CPC .... A61F 2/64; A61F 2/80; A61F 2002/30492; A61F 2002/30563; A61F 2220/0041
See application file for complete search history.

(56) References Cited

U.S. PATENT DOCUMENTS

| | | |
|---|---|---|
| 41,934 A | 3/1864 | Monroe |
| 1,153,532 A | 9/1915 | Apgar |
| 2,696,011 A | 12/1954 | Galdik |
| 3,461,464 A | 8/1969 | Lindgren |
| 4,312,080 A | 1/1982 | Staats |
| 4,459,709 A | 7/1984 | Leal et al. |
| 4,872,879 A | 10/1989 | Shamp |
| 4,911,709 A | 3/1990 | Marlow et al. |
| 5,133,777 A | 7/1992 | Arbogast et al. |
| 5,228,164 A | 7/1993 | Graf et al. |

(Continued)

OTHER PUBLICATIONS

D-Rev, ReMotion Knee, http://d-rev.org/projects/mobility/, retrieved Jun. 2, 2017 (4 pages).

(Continued)

*Primary Examiner* — Jerrah Edwards
*Assistant Examiner* — Aren Patel
(74) *Attorney, Agent, or Firm* — Allan A. Fanucci, Esq.

(57) ABSTRACT

An artificial knee that includes a first knee component having an extension member, a second knee component having a slot configured and dimensioned to allow the extension member to move therein. A fastener connects the knee components to facilitate rotation of the knee components between an upright and rotated positions. The knee components also include a terminal end that includes a central opening and transverse apertures to receive pylons therein. A biasing member of a flexible rod or tube of an elastomeric material urges the knee components towards the upright position when the knee components are rotated. The biasing member passes through the apertures of the terminal ends of the knee components, as well as through the extension member and the slot. Also, a prosthetic leg along with a kit and method for assembling the prosthetic leg.

20 Claims, 15 Drawing Sheets

(56) References Cited

U.S. PATENT DOCUMENTS

| | | | |
|---|---|---|---|
| 5,724,714 A | 3/1998 | Love | |
| 5,888,231 A | 3/1999 | Sandvig et al. | |
| 6,508,842 B1 | 1/2003 | Caspers | |
| 6,793,682 B1 | 9/2004 | Mantelmacher | |
| 7,153,327 B1 * | 12/2006 | Metzger | A61F 2/3868 623/20.29 |
| 7,883,547 B2 | 2/2011 | Mantelmacher | |
| 8,313,534 B1 * | 11/2012 | Chen | A61F 2/644 623/43 |
| 10,376,390 B1 | 8/2019 | Johnson | |
| 2004/0153168 A1 | 8/2004 | Childress et al. | |
| 2005/0015156 A1 * | 1/2005 | Hikichi | A61F 2/64 623/44 |
| 2005/0143839 A1 * | 6/2005 | Chen | A61F 2/644 623/39 |
| 2006/0173554 A1 | 8/2006 | Slemker et al. | |
| 2007/0055383 A1 | 3/2007 | King | |
| 2008/0133019 A1 * | 6/2008 | Andrysek | A61F 2/68 623/20.14 |
| 2010/0114331 A1 | 5/2010 | Mantelmacher | |
| 2010/0304205 A1 | 12/2010 | Jo et al. | |
| 2010/0305698 A1 * | 12/2010 | Metzger | A61F 2/3836 623/13.12 |
| 2011/0009981 A1 * | 1/2011 | Okuda | A61F 2/68 623/32 |
| 2014/0277584 A1 | 9/2014 | Hurley et al. | |
| 2018/0161180 A1 | 6/2018 | Arelekatti | |
| 2020/0297514 A1 | 9/2020 | Prescott | |

OTHER PUBLICATIONS

Williams, "Nonprofit Hope to Walk helping injured get back on their feet," The Roanoke Times, Mar. 26, 2016 (9 pages); http://www.roanoke.com/news/local/blacksburg/nonprofit-hope-to-walk-helping-injured-get-back-on-their/article_1ae3a731-e6bf-5bb6-aa93-09d2273d7bc2.html.

OConnor, "Johnson City man creates affordable prosthetics," News 5 WCYB, Sep. 30, 2015 (6 pages); http://www.wcyb.com/meet-the-term/kristi-oconnor/8196910).

Techform. Material Safety Data Sheet. Ossur, Jan. 2011. (in related U.S. Appl. No. 15/613,045, now U.S. Pat. No. 10,376,390.).

Össur, Modular Socket System-Direct Lamination, 2015. (in related U.S. Appl. No. 15/613,045, now U.S. Pat. No. 10,376,390.).

Össur, Össur Presents: Modular Socket System, YouTube video screen shot, Aug. 22, 2011. (in related U.S. Appl. No. 15/613,045, now U.S. Pat. No. 10,376,390.).

SPS PVA Bag, SPS Website; date verified by the wayback machine Mar. 7, 2016. (in related U.S. Appl. No. 15/613,045, now U.S. Pat. No. 10,376,390.).

U.S. Appl. No. 16/678,919, Non-Final Office Action, dated Dec. 8, 2020.

U.S. Appl. No. 16/678,919, Notice of Allowance, dated Apr. 15, 2022.

* cited by examiner

ARTIFICIAL KNEE AND PROSTHETIC ASSEMBLY KIT THEREFOR

CROSS-REFERENCE TO RELATED APPLICATIONS

This application is a continuation-in-part of nonprovisional application Ser. No. 16/678,919 filed Nov. 8, 2019, now U.S. Pat. No. 11,419,730, which claims the benefit of provisional application No. 62/758,478 filed Nov. 9, 2018. This application also claims the benefit of provisional application No. 63/264,440 filed Nov. 23, 2021. The entire content of each application mentioned in this section is expressly incorporated herein by reference thereto.

BACKGROUND

The present invention relates to artificial knee joint that has a simple, low-cost, light-weight design and to a prosthetic leg and assembly kit therefor that includes inexpensive well-engineered components that are easy to install on a patient in need of a leg prosthetic.

There are millions of people across the world that are in need of various prosthetic devices. A majority of these people are amputees that live in developing countries having large populations and often with lower standards of living, such that those amputees are not able to afford the costs of obtaining such devices. Their inability to obtain such devices compromises their ability to obtain employment. Also, the legs of many amputees have been removed by being cut above the knee, further complicating the type of prosthesis needed which for this situation requires one that includes an artificial knee component.

Current above-knee prostheses being distributed in the developing countries typically employ single-axis joints with or without manual locks. These prostheses often inhibit normative gait and suffer frequent mechanical failures resulting in low-user satisfaction and disappointment in adopting prosthetic assistance.

Although a number of more advanced prosthetic limbs and assistive devices have been designed for people the more developed world, very few of them have been suitable for large-scale use in developing countries. For example, U.S. Pat. No. 4,614,518 discloses an artificial limb with automatic release for free rotation that can be used as an artificial knee. This device is complicated and includes structures for providing both vertical rotation and horizontal movement. In addition, it is a costly device that is not affordable by poor or disadvantaged persons.

US patent publication 2020/0146833 discloses an improved artificial knee that has first and second knee components connected together for rotation between a first, upright position and a second position where one knee component is positioned at an angle to the other, an alignment mechanism associated with the first and second knee components to assure rotation in a vertical plane from the first position to the second position, and a biasing member. One knee component includes an extension member located in a central location, while the other includes a centrally located slot that receives the extension member and allows rotation only in a vertical plane. The biasing member normally holds the knee components in the first position, such that rotation of the first knee component away from the second knee component stretches or elongates the biasing member to provide a force that urges the knee components to move back to the first position. The device of FIGS. 1-3 of that application requires an elastomeric member having apertures for securement to the knee components by a bolt and nut arrangement. Other embodiments require careful operation and use due to the exposure of the metal spring biasing members that are present.

Accordingly, there is the need for an artificial knee that is both highly functional yet available at a relatively low cost. A kit that includes such an artificial knee along with other inexpensive, well-engineered components is also needed in order to provide a method for easily installing a leg prosthesis on a patient. These needs are now met by the present invention.

SUMMARY OF THE INVENTION

The present invention now provides an artificial knee that includes first and second knee components connected together for rotation between an upright position and one or more rotated positions. The first knee component has a first end configured for receiving a rod member and a second end that includes an extension member located in a generally central location of that end. The second knee component comprises a cylindrical member having a first end configured for receiving a rod member and a second end that includes a slot formed by a pair of side walls surrounding a U-shaped recess. The slot is generally centrally located between the side walls and configured and dimensioned to allow the extension member of the first knee component to rotate therein, such that rotation of the knee components is achieved as the extension member rotates in the slot between the upright and rotated positions.

The artificial knee includes a fastener for connecting together the first and second knee components, wherein the fastener passes through the side walls and slot of the second knee component and through the extension member of the first knee component to facilitate rotation of the knee components. Also provided is a biasing member comprising a flexible rod or tube of an elastomeric material operatively associated with the first and second knee components for urging those components towards the upright position. Therefore, rotation of the second knee component toward a rotated position stretches or elongates the biasing member to provide a force that urges the knee components towards the upright position when one or both knee components are rotated.

Advantageously, the first end of each knee component includes a central opening for receiving the rod member and first and second apertures arranged transversely to and providing side access to the central opening. This allows the biasing member to pass through the apertures of the terminal end of the first knee component, alongside the extension member of the first knee component, through the slot of the second knee component.

In a preferred embodiment, the artificial knee comprises a first knee component having an extension member, a second knee component having a slot configured and dimensioned to allow the extension member to move therein. A fastener connects the knee components to facilitate rotation of the knee components between an upright position and one or more rotated positions. The knee components also include a terminal end that includes a central opening and transverse apertures to receive pylons therein. A biasing member comprising a flexible rod or tube of an elastomeric material urges the knee components towards the upright position after the knee components are rotated. The biasing member passes through the apertures and central opening of the terminal end of the first knee component, as well as past the extension member of the first knee component and through the slot of the second knee component before passing through the apertures and central opening of the terminal end of the second knee component.

As the artificial knee of the invention is preferably used to provide a prosthetic leg to a person in need thereof, the artificial knee is typically utilized with a number of other components, including first and second pylons, one above and one below the artificial knee and an artificial foot. The central opening of the terminal end of each knee component is configured for receiving an end of a pylon therein. Also provided various components for connecting the pylons to the user's thigh and to the artificial foot. In one embodiment, these components include a first connector associated with the first pylon and including a cylindrical body and a connector plate; a socket support associated with the connector plate of the first connector; and a second connector associated with the second pylon and including a cylindrical body and a connector plate for attachment to the artificial foot. In another embodiment, the socket support and connector are provided as a separate, unitary component, while in yet another embodiment, the socket plate is adjustably secured directly to the first pylon.

The present invention further provides a prosthetic leg along with a kit and method for assembling the prosthetic leg on a person in need thereof. The prosthetic leg includes the components of the artificial knee, biasing member, fastener, first and second pylons, and foot component, along with additional fasteners for securing certain of the parts together. Various connectors, fasteners and adhesives are also provided. All the necessary components are typically provided in a kit and the prosthetic leg is generally assembled from the kit components according to the inventive method that is also provided herein.

BRIEF DESCRIPTION OF THE DRAWING FIGURES

The nature and various advantages of the present invention will become more apparent upon consideration of the following detailed description, taken in conjunction with the accompanying drawings, in which.

DETAILED DESCRIPTION OF THE INVENTION

In the description that follows certain terms are used as defined herein.

The term "upright position" is used to indicate the initial arrangement of the overall leg prosthesis where in the first and second knee components are typically oriented vertically with the contact portions of each component in contact. This position simulates the position of the artificial leg when assembled on a patient and the patient is standing.

The term "rotated position" is used to indicate any position other than the upright position where the first knee component can rotate in a vertical and arcuate line to facilitate the movement of the lower leg portion of the overall leg prosthesis. Depending upon the type of walking, running movement or when the wearer is sitting, the rotated position can be close to the upright position at a minimum but terminated at a blocked or stop position.

The term "blocked or stop position" means the position wherein a forward end of the first knee component contacts a wall member of the second knee component to prevent further angular or rotational movement.

When the term "about" is used to define a numerical value, it is intended to mean a tolerance of up to 15% of the specific value recited.

Figure 1:
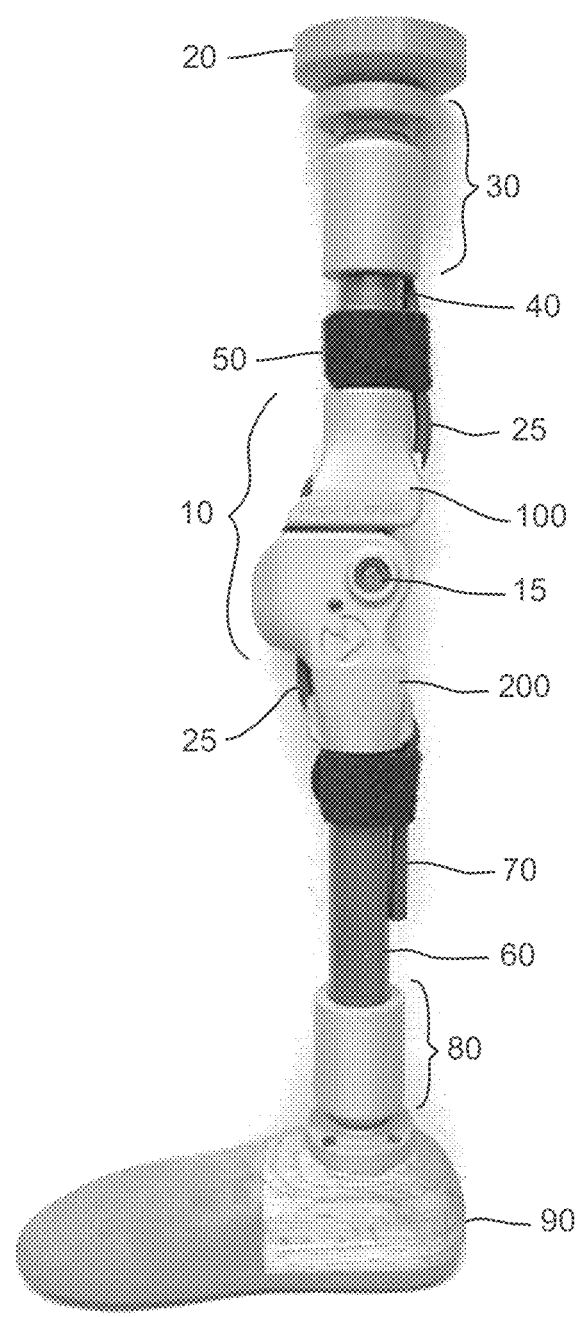
FIG. 1 is a side view of a complete leg prosthesis that includes the artificial knee and kit components of the present invention.
Figure 2:
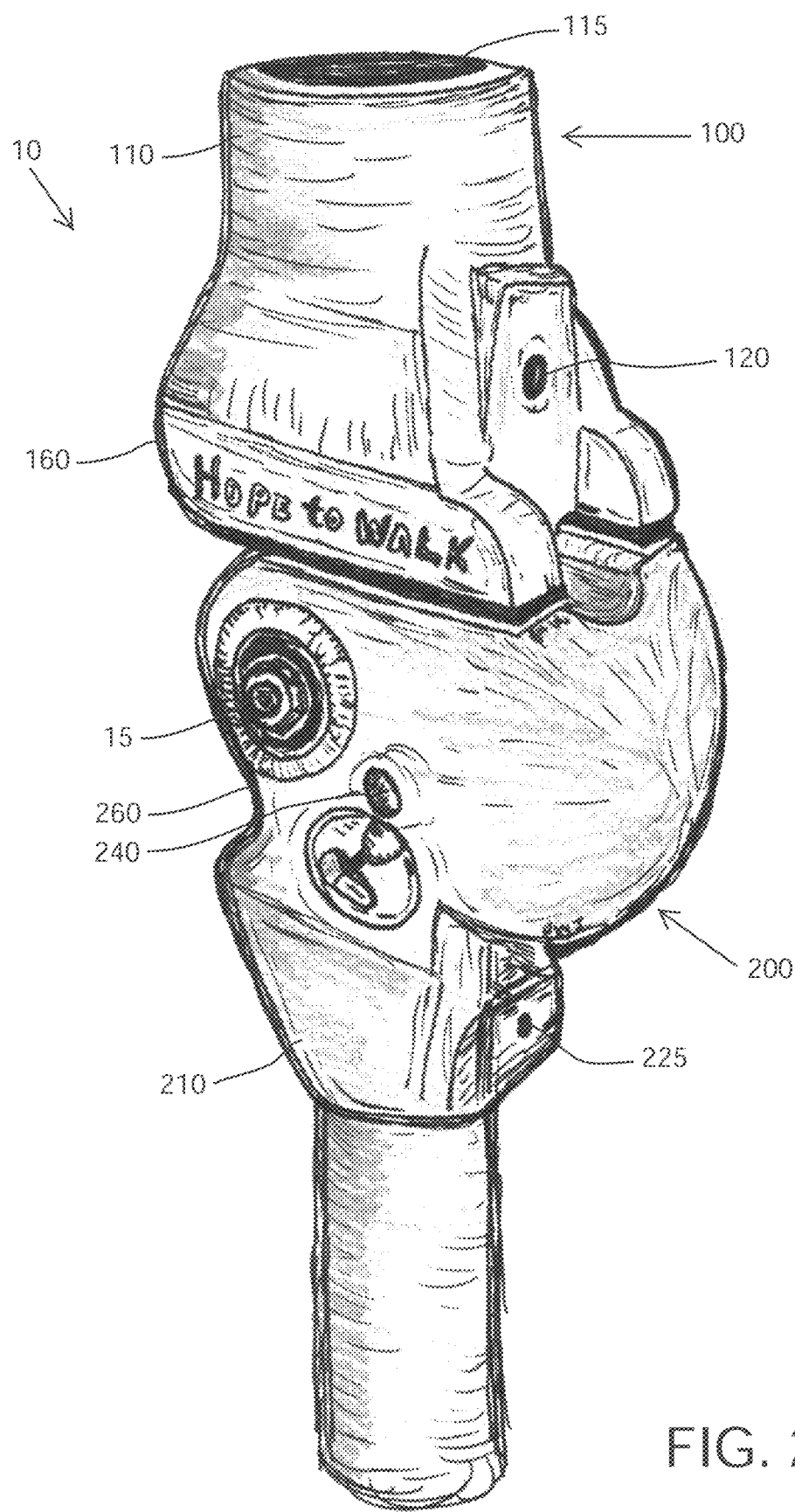
FIG. 2 is perspective view of the artificial knee of the present invention without the biasing member.

Turing now to the drawings, FIG. 1 shows the prosthetic leg that is provided by the present invention. This leg includes an artificial knee 10 having two knee components 100, 200 joined by a fastener 15, biasing member 25, socket support 20, socket support connector 30, first pylon 40, a first hook and loop band 50 for securing one end of the biasing member 25 to the first pylon 40, a second pylon 60, a second hook and loop band 70 for securing the other end of the biasing member 25 to the second pylon 60, a foot connector 80 and an artificial foot 90. These components are described in further detail in connection with the description of the other drawing figures.

Figure 3:
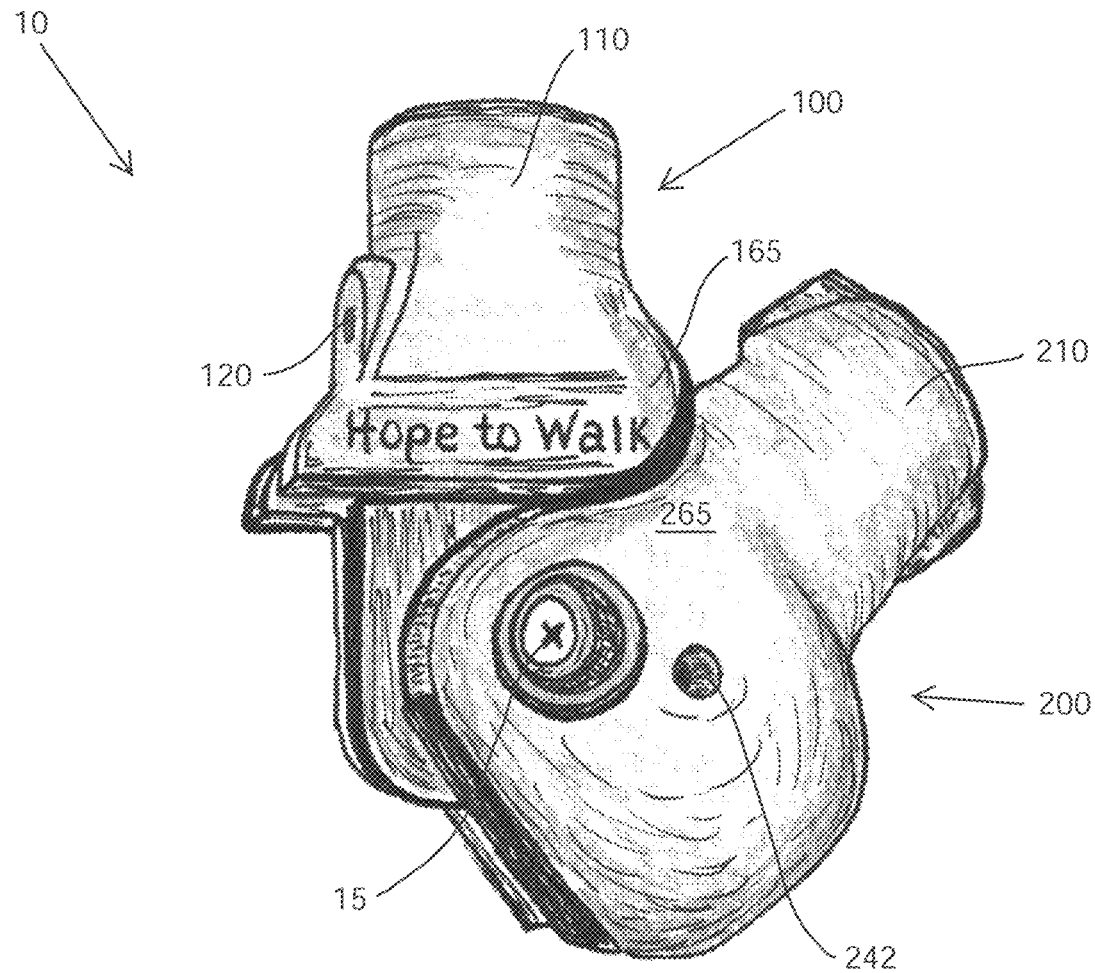
FIG. 3 is a side view of the artificial knee of FIG. 2 in a fully extended rotational position.
Figure 4:
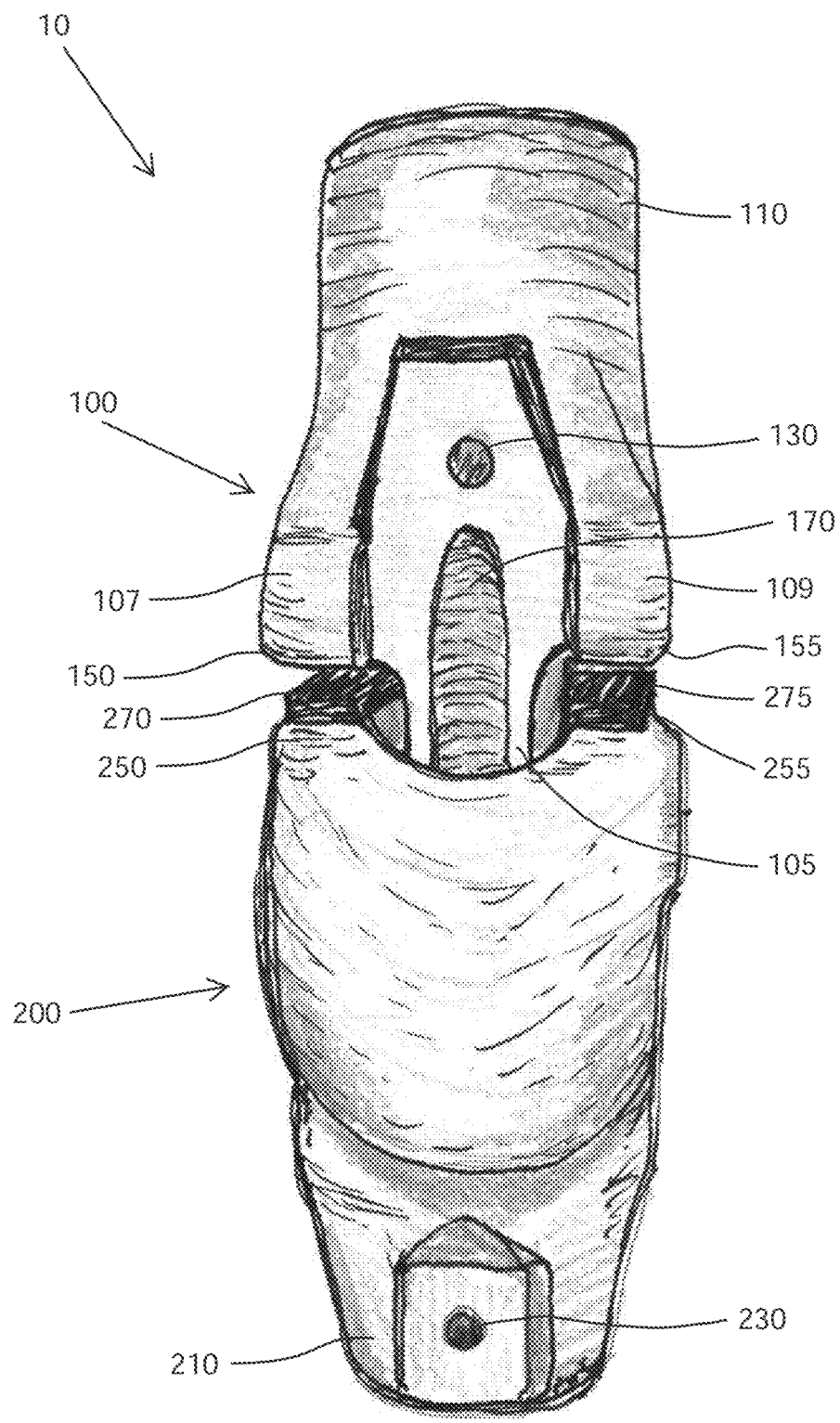
FIG. 4 is a front view of the artificial knee of FIG. 2.
Figure 14:
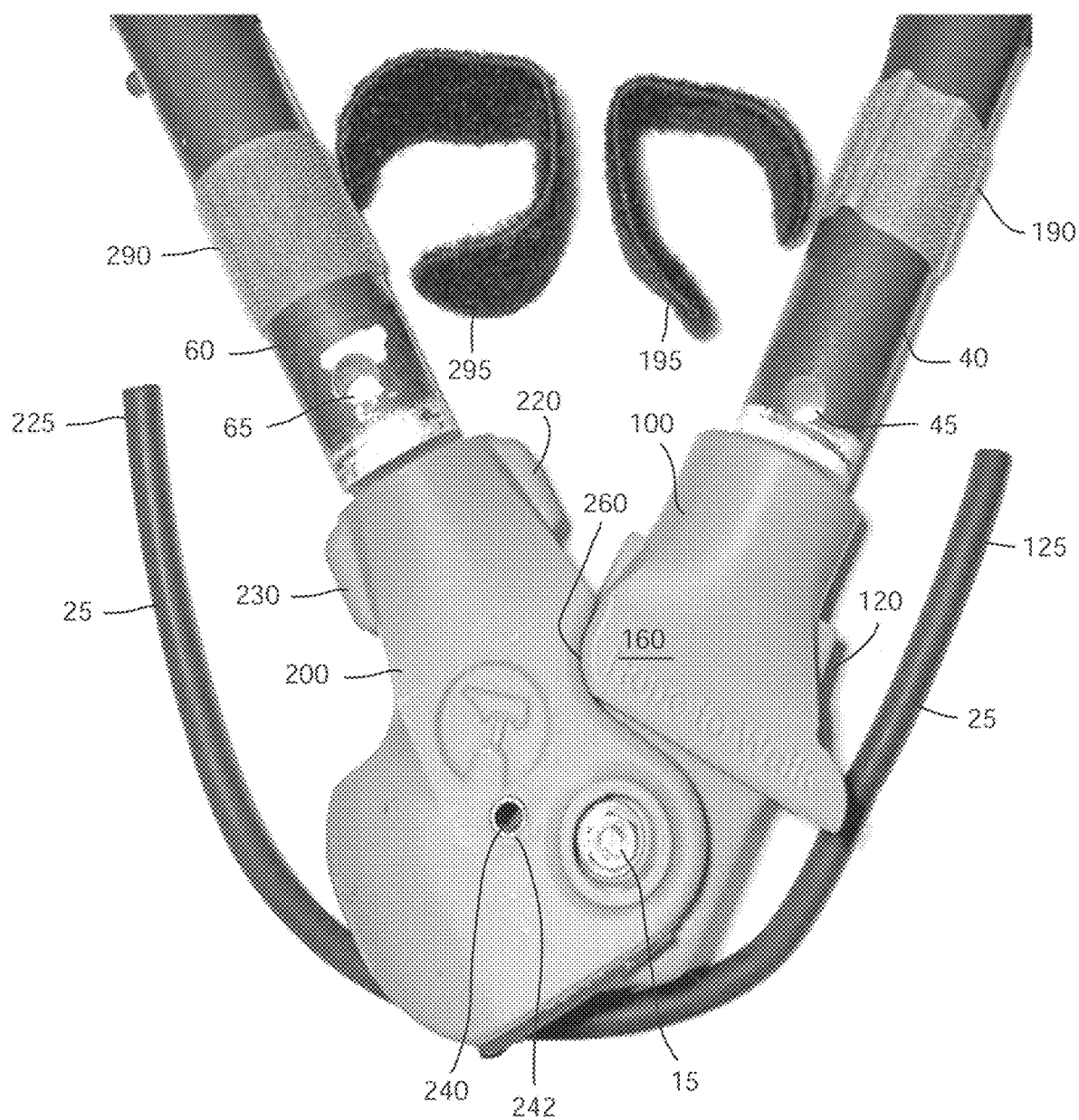
FIG. 14 is a side view of the artificial knee of FIG. 1 in a fully extended or bent position with additional components not yet fully assembled.
Figure 15:
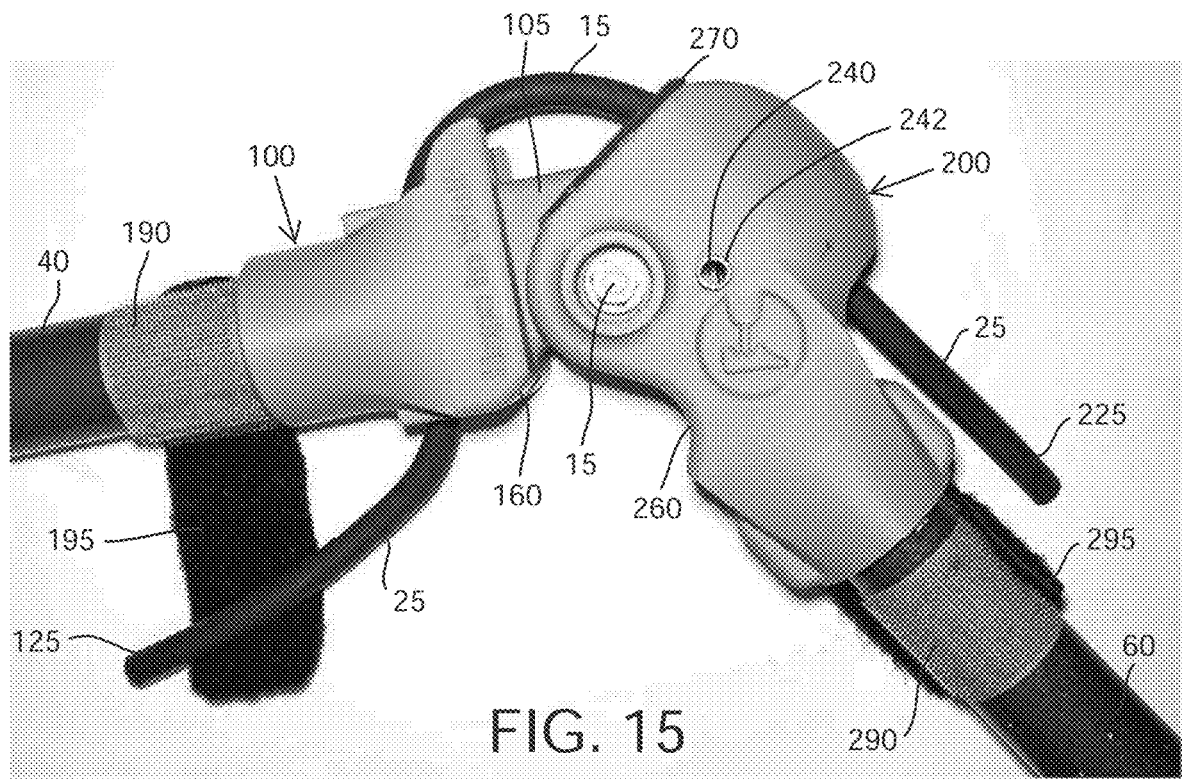
FIG. 15 is a side view of the artificial knee of FIG. 14 with the biasing member partially attached.

The first and second knee components 100, 200 are connected together for rotation between an upright position as shown in FIGS. 1, 2, 4, 5 and 16 and one or more rotated positions as shown in FIGS. 3, 14 and 15. As the socket support 20 is connected to other components that are attached to the person's thigh stump, the first knee component 100 is more or less fixed in a generally vertical position while the second knee component 200 is able to rotate with respect to the first knee component 100 as the person wearing the prosthetic leg is walking, running or sitting with the amount of rotation variable between the upright position and the blocked or stop position as best shown in FIGS. 3 and 14 wherein a forward end of the first knee component contacts a wall member of the second knee component. Note that FIG. 3 is the opposite side view to that of FIGS. 2 and 14-16.

The first knee component 100 includes an extension member 105 as best shown in FIGS. 6 to 9. The extension member 105 is located in a generally central location in a lower portion of the first knee component 100. The second knee component 200 includes a slot 201 generally centrally located between a pair of side walls 207, 209 with the slot configured and dimensioned to allow the extension member 105 of the first knee component 100 to move therein. This arrangement enables the second knee component 200 to rotate with respect to the first knee component 100 as the extension member 105 moves in the slot 205 between the upright and rotated positions.

Figure 5:
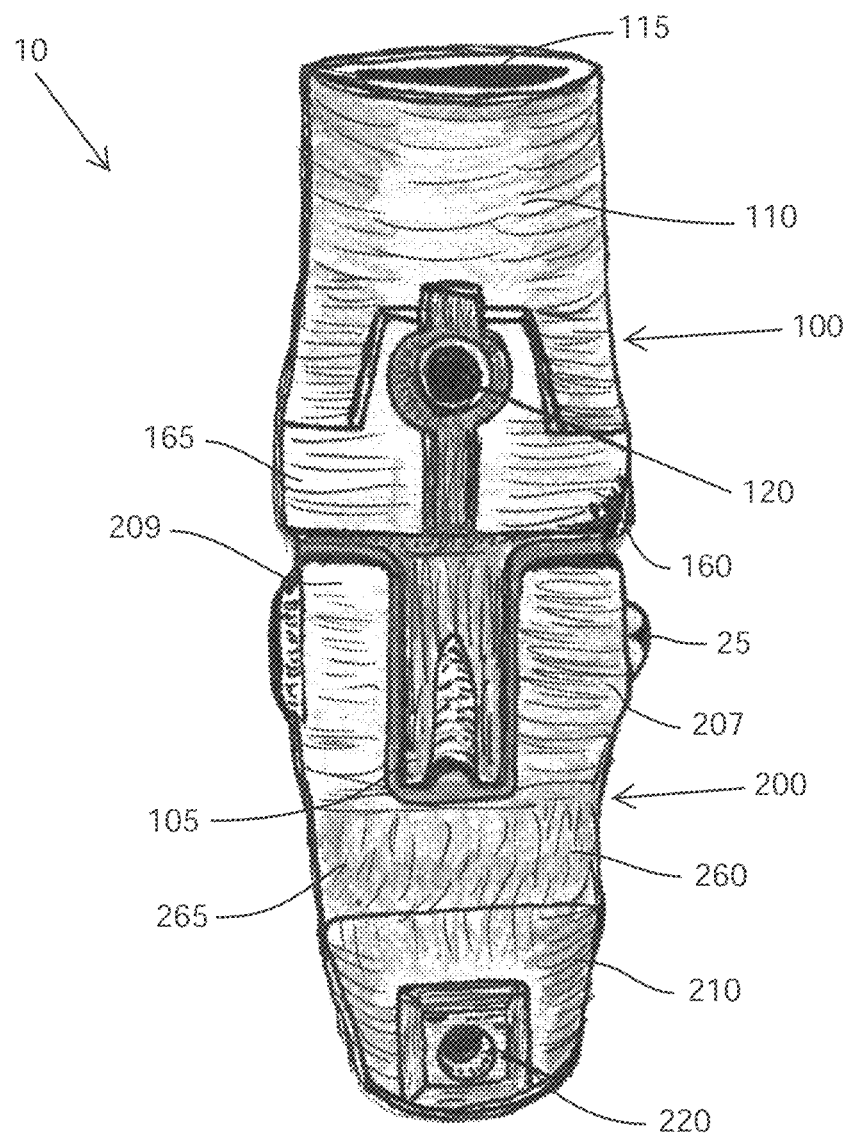
FIG. 5 is a rear view of the artificial knee of FIG. 2.
Figure 6:
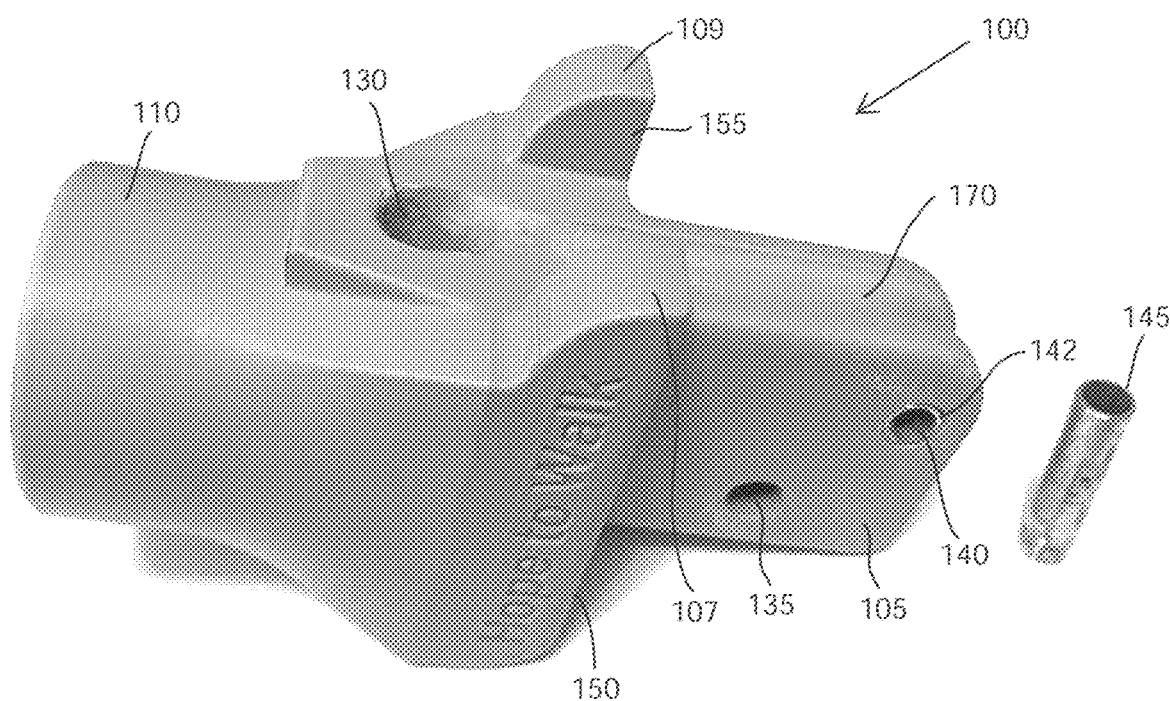
FIG. 6 is a perspective view of a first knee component and hole sleeve of the artificial knee of the invention.
Figure 7:
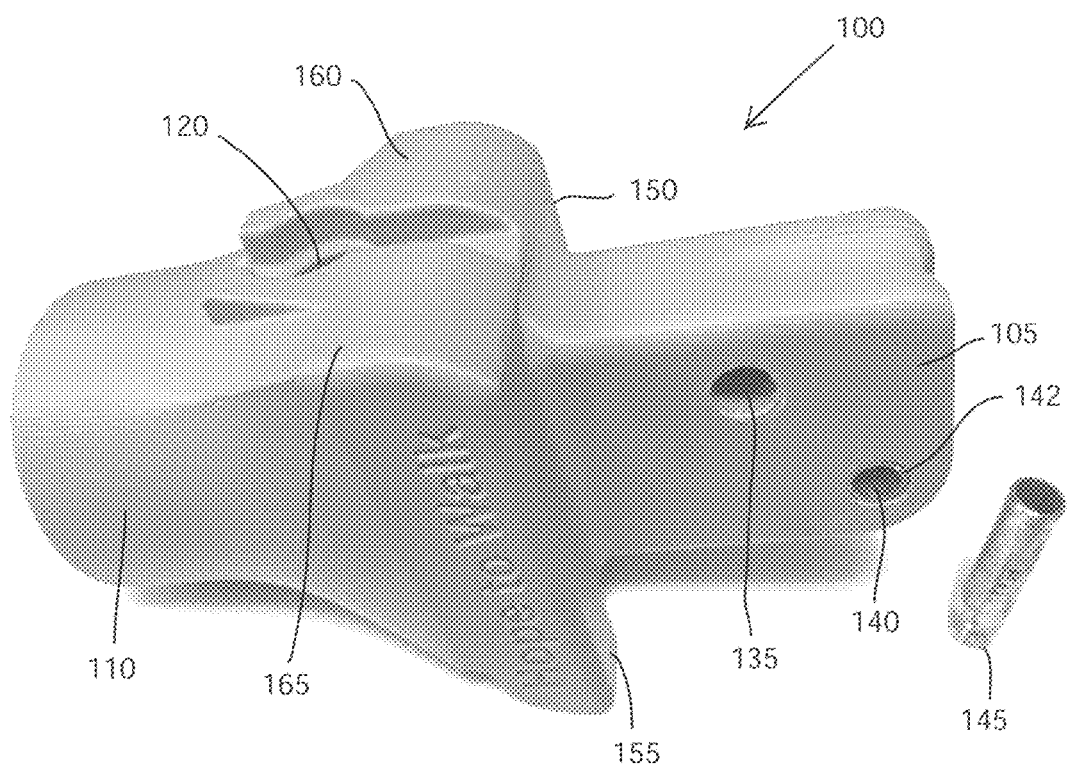
FIG. 7 is another perspective view of the first knee component and hole sleeve of FIG. 6.
Figure 8:
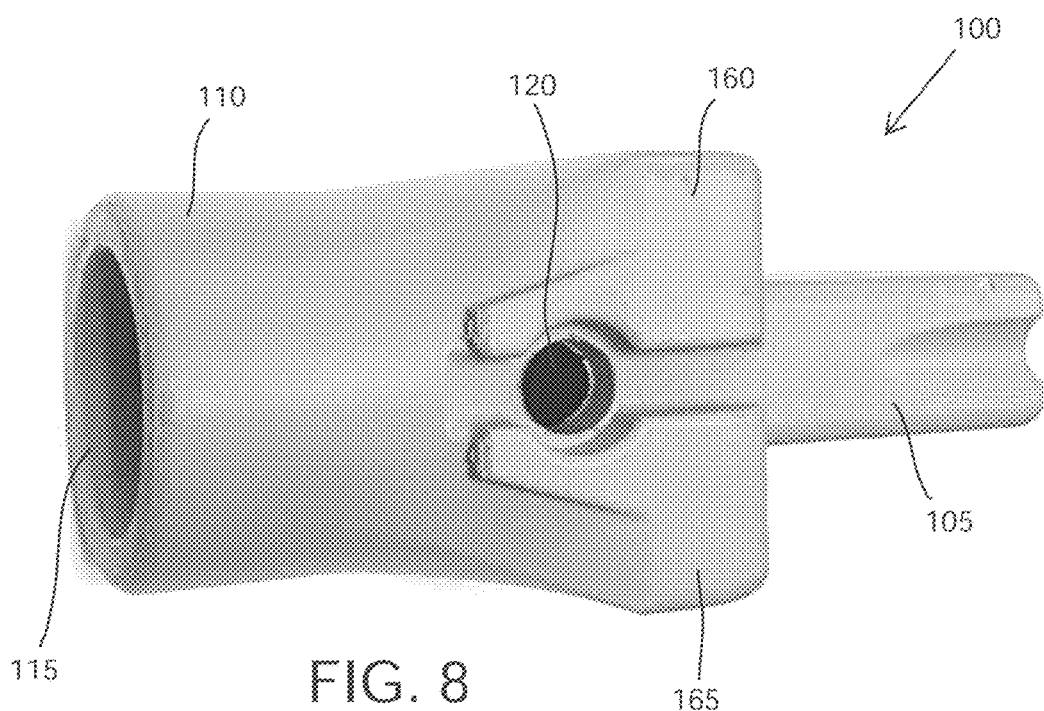
FIG. 8 is a back view of the first knee component of FIG. 6.
Figure 9:
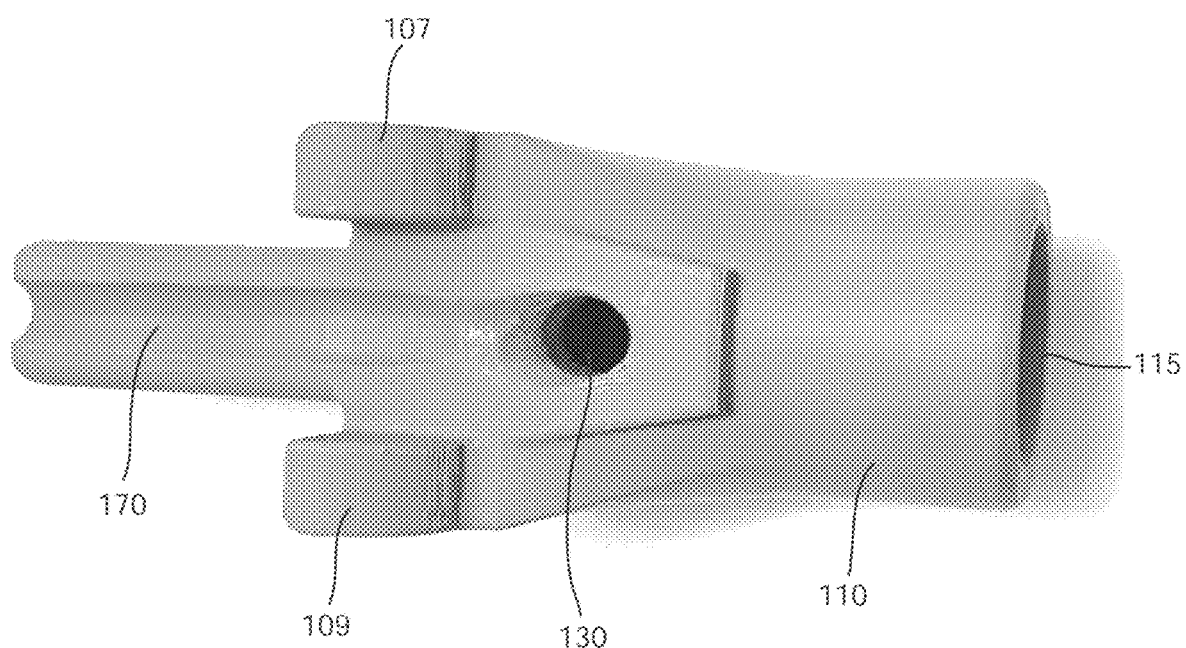
FIG. 9 is a front view of the first knee component of FIG. 6.
Figure 10:
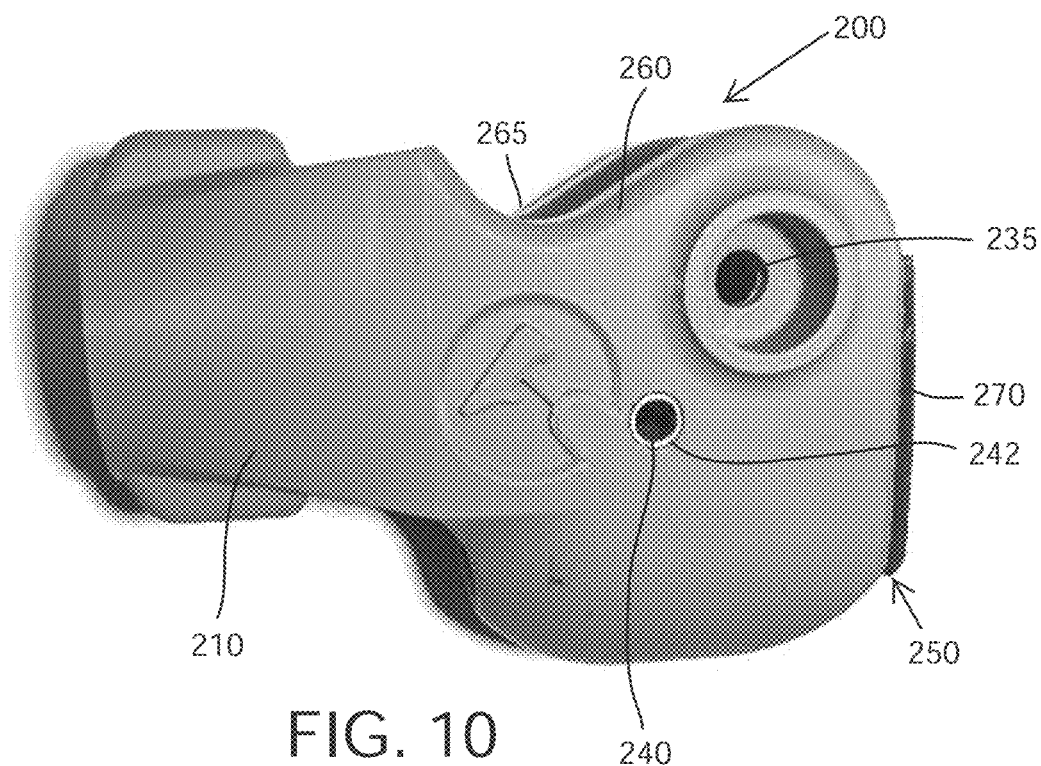
FIGS. 10 and 11 are side views of a second knee component of the artificial knee of the invention.
Figure 11:
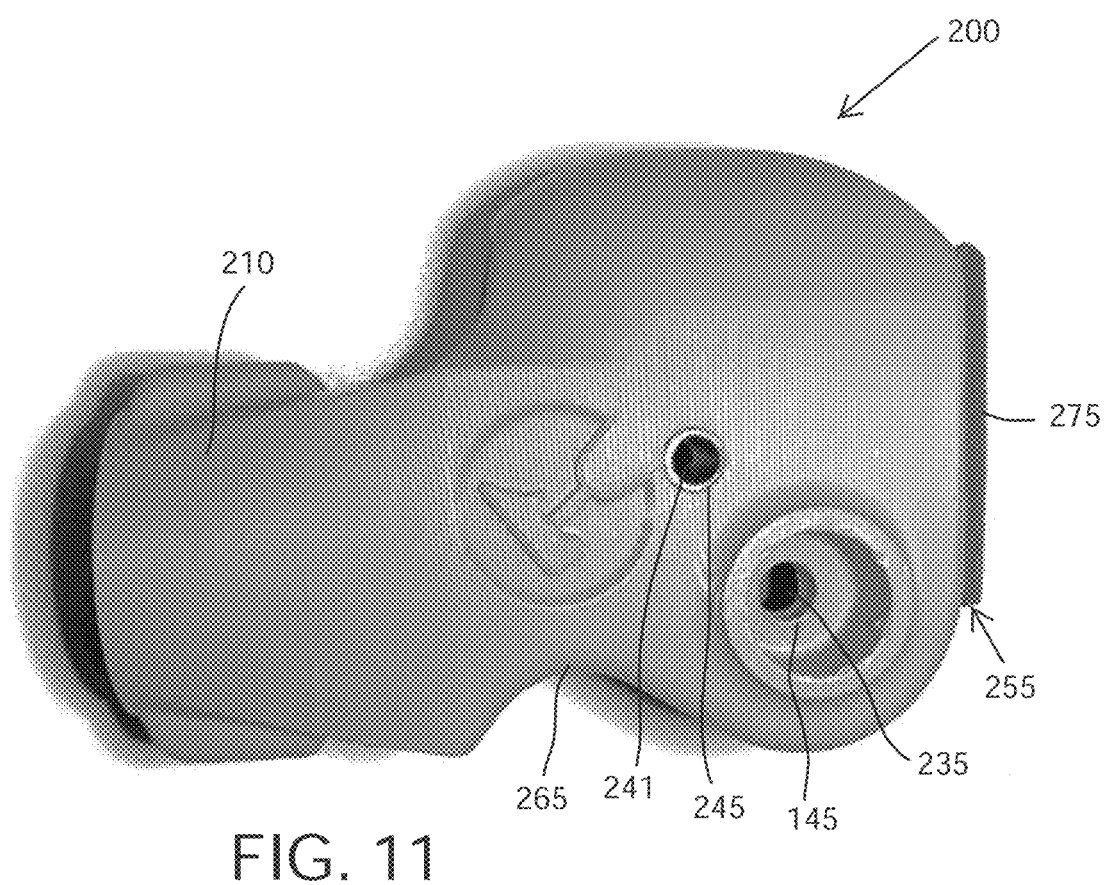
Figure 12:
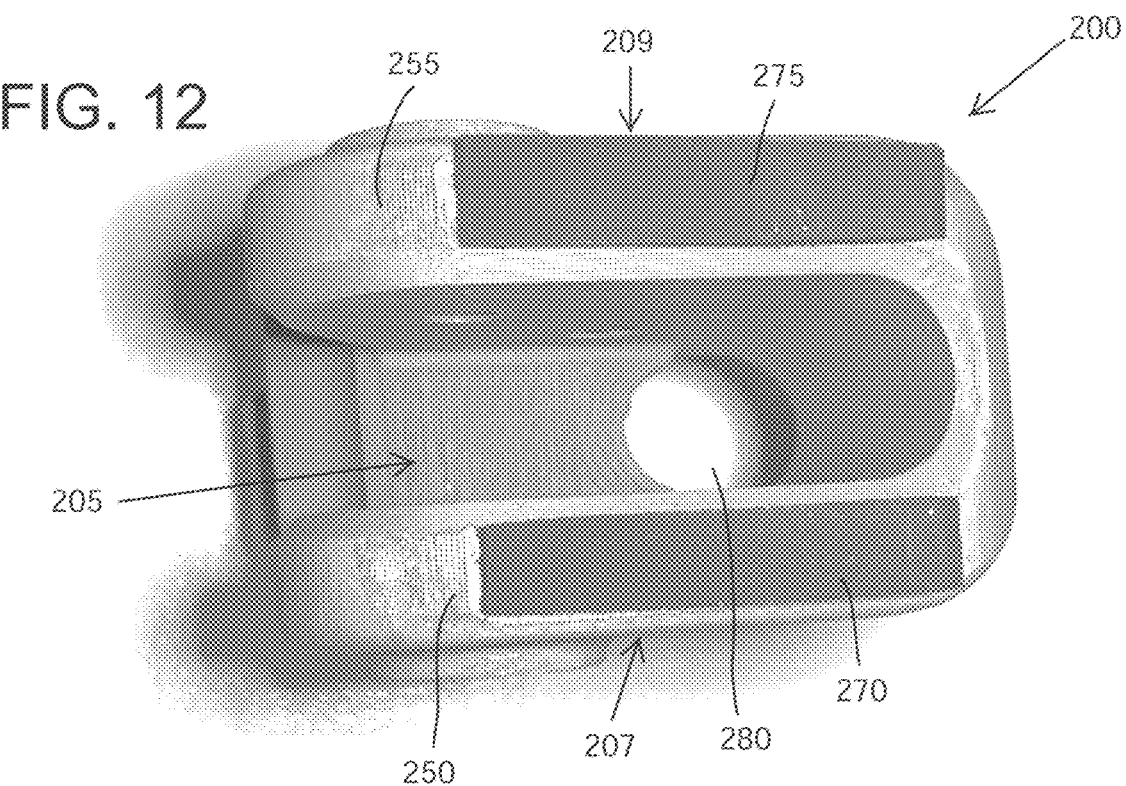
FIG. 12 is a top view of the second knee component of FIGS. 10 and 11.
Figure 13:
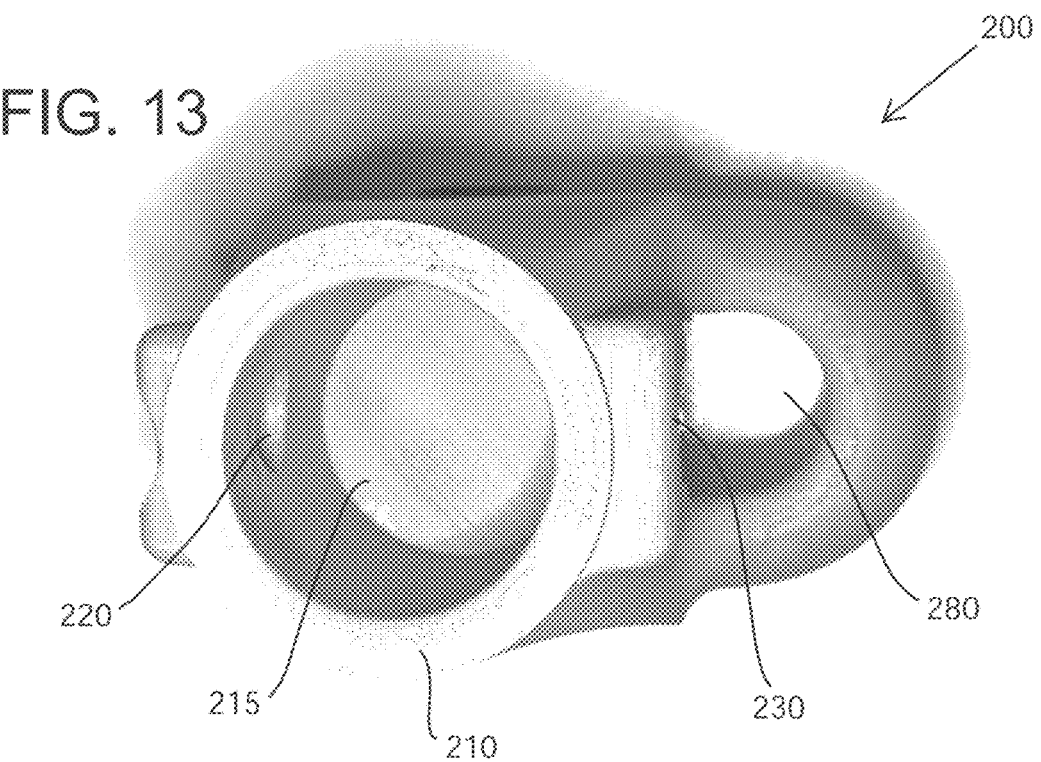
FIG. 13 is a bottom view of the second knee component of FIGS. 10 and 11.

The two knee components are shown as joined together in FIGS. 2, 3, 14 and 15. The details of the first knee component 100 are best shown in FIGS. 4-9 while those of the second knee component 200 are best shown in FIGS. 10-13 as those drawings are different views of the components without the fastener 15 or biasing member 25. These knee components 100, 200 each include a terminal end 110, 210 that includes a central opening 115, 215, first apertures 120, 220 and second apertures 125, 225 wherein the apertures are arranged transversely to and providing side access to the central opening 115, 225. FIGS. 7-8 best show the protrusions 160, 165 of the first knee component. FIG. 12 shows further details of the second knee component 200, including slot 205, contact portions 250, 255, recess portions 260, 265, dampening members 270, 275 and opening 280 that forms part of slot 205. The recess portions 260, 265 can be provided as separate features or they can be combined to form a single recess as shown in FIG. 5.

FIGS. 2, 3, 14 and 15 show that the first and second knee components 100, 200 are connected by a fastener 15 that passes through the side walls 207, 209 and slot 205 of the second knee component 200 and through the extension member 105 of the first knee component 100 to facilitate rotation of the knee components. The fastener is preferably a bolt, nut and washer assembly of sufficient length to pass through the knee components as described in order to rotatably attach them together.

A biasing member 25 comprising a flexible rod or tube of an elastomeric material, preferably natural rubber, is operatively associated with the first and second knee components for attempting to maintain the knee components in the upright position. Rotation of the second knee component toward a rotated position stretches or elongates the biasing member 25 to provide a force that urges the first knee component to rotate back to the upright position. One end 125 of the biasing member 25 passes through aperture 120 of the terminal end of the first knee component, through the central opening 115, then through aperture 125 of the terminal end of the first knee component 100, then alongside the extension member 105 adjacent groove 170, through an opening 280 forming part of the slot 205 of the second knee component 200, and then through aperture 225, central opening 215 and aperture 220 of the terminal end 210 of the second knee component 200. Groove 170 assists in retaining the biasing member 25 in contact with the extension member 105 as it moves to a rotated position. This arrangement enables the biasing member 25 to be fully functional while minimizing its exposure outside of the artificial knee 10. This prevents damage to the biasing member as well as a squeezing injury to fingers that could get caught beneath it if it was further exposed.

The first and second pylons 40, 60, are operatively associated with the first and second knee components 100, 200, respectively. The respective central openings 115, 215 of the terminal ends 110, 210 of each knee component is configured for receiving an end of its associated pylon 40, 60 therein. Each pylon 40, 60 is configured with a transverse bore 45, 55 as best shown in FIG. 14 which are of the same diameter as the apertures 120, 130, 220, 230 so that the bores align with the apertures in the terminal ends of the knee components. In FIG. 14, the pylons are shown rotated about 90 out of position in order to show these bores 45, 55. When assembled, the pylons are positioned with the bores 40, 45 in alignment with the apertures 120, 130, 220, 230 so that the biasing member 25 can also pass through the transverse bores 45, 65 of the pylons 40, 60 to help secure the pylons to the knee components 100, 200.

The inner perimeters of the central openings 115, 215 are configured in the same manner as the outer perimeters of the pylons 40, 60. Preferably and for convenience, all inner and outer perimeters are circular although other shapes such as polygons, ovals, stars or combinations thereof can be used if desired. Preferably, each central opening and pylon is cylindrical, as this provides a nice appearance as well as to facilitate receiving of the preferred pylon construction which comprises a cylindrical wood dowel surrounded by a plastic conduit or tube. The plastic tube enhances the environmental resistance of the wood dowel while the wood dowel is inexpensive and provides good strength. Of course, metal rods or tubes of other, different outer perimeters can be used as long as the central openings are configured in the same manner to receive them.

The biasing member 25 includes first and second end portions 125, 225 that are respectively secured to the pylons 40, 60 to hold the biasing member 25 in place and to further secure the pylons 40, 60 to the knee components 100, 200. The first end portion 125 of the biasing member 25 extends from the second aperture 135 of the terminal end 110 of the first knee component 100 while the second end portion 235 of the biasing member 25 extends from the first aperture 220 of the terminal end 210 of the second knee component 200. The most preferred biasing member is a flexible, solid, cylindrical natural rubber rod or cord, and the end portions 125, 225 of the biasing member are preferably secured to the pylons 40, 60 using bands of hook and loop fasteners 50, 55. One of bands 190, 290, preferably the one that has hooks, is secured to the pylon 40, 60 by an adhesive, while the other band 195, 295, preferably the one that has loops, engages the secured band 190, 290 with the end of the biasing member 125, 225 held between the secured bands.

Alternatively, the band can be stretched before the end portions 125, 235 are provided with knots that prevent the ends of the bands from passing or retracting into their respective apertures of the knee components: i.e., the second aperture 135 of the terminal end 110 of the first knee component 100 for end portion 125 and the first aperture 220 of the terminal end 210 of the second knee component 200 for end portion 235. This is a simpler arrangement that eliminates the need for the hook and loop fasteners while also providing a secure connection of the biasing member 25 to the knee components 100, 200.

Both arrangements keep the biasing member 25 from moving out of position or becoming disconnected during use. These constructions also facilitate replacement of a broken or overstretched biasing member if and when necessary. The broken or damaged biasing member 25 can be removed by opening the hook and loop fasteners. When knots are instead used, the end of a biasing member that is broken can be simply pulled out of their respective apertures while a damaged but unbroken biasing member can either be untied and removed or cut and removed. The elastomeric material of the biasing member is selected to provide a long service life such that if the biasing member is not damaged it should function properly for many years.

To provide a lightweight device with sufficient strength, each knee component 100, 200 is made of a plastic material, with polylactic acid (PLA) being preferred so that the parts can be 3D printed. Of course, other high strength plastic materials that can be molded to the desired shapes can also be used. Examples of such materials include ULTEM (polyetherimide), PEEK (polyether ether ketone), PPS (polyphenylene sulfide) and LCP (liquid crystal polymer). A skilled artisan can select the optimum plastic material for these parts from these or other plastic materials. When the fastener 15 is a metal bolt, nut and washer arrangement like that shown in FIGS. 21 and 22, it is advantageous to reinforce the fastener holes 135, 235 in the plastic knee component 100, 200. Thus, a single metal sleeve 145 extends through those holes so that the fastener 15 can pass through the side walls 207, 209 and slot 205 of the second knee component 200 as well as through the extension member 105 of the first knee component while being prevented from contacting the plastic material of the knee components. Specifically, the single metal sleeve 145 is configured and dimensioned to extend through both holes 135, 235 in the two knee components. This arrangement enables the plastic parts to resist wear and provide a long service life.

The artificial knee 10 of the invention further comprises at least one but preferably multiple contact portions or contact surfaces 150, 155, 250, 255 associated with each knee component as best shown in FIGS. 6, 7 and 10-12. These portions or surfaces are configured for surface-to-surface contact when the first and second knee components are in the upright position with the more contact portions also acting as a stop member to prevent rotation of the knee components past the upright position. Advantageously, at least one or more of the contact portions 150, 155, 250, 255 includes a dampening member. Preferably, at least two contact portions, such as both contact portions 250, 255 of the second knee component 200 include dampening members 270, 275. Alternatively, contact portions 150, 155 of the first knee component, or even all contact portions 150, 155, 250, 255, can include dampening members. Preferred dampening members include flexible materials such as a flexible plastic, elastomeric or polyurethane pad. Typically, these pads are glued or otherwise adhered to the contact portions with a suitable adhesive.

Preferably, the extension member 105 of the first knee component 100 comprises a central wall member that extends between and away from the surface portion(s) of the first knee component and the slot 205 of the second knee component 200 comprises a centrally located U-shaped recess between the side walls 207, 209 which is configured and dimensioned to receive the extension member 105 and to allow it to rotate therein.

To prevent further rotational movement of the knee components beyond a rotated position of about 135 degrees from the upright position, the first knee component comprises one or more protrusions 160, 165 and the second knee component comprises one or more recess portions 260, 265 for receiving the protrusion. This is shown in FIGS. 3 and 15 wherein contact between the protrusions 160, 165 and the single recess formed of recess portions 260, 265 act as a stop member to prevent rotations beyond about 135 degrees.

The artificial knee of the invention preferably includes a locking member connecting the first and second knee components for retaining the knee components in the upright position. This locking member can be a simple rod, nail, pin or bolt and nut fastener that is inserted in locking holes 140, 240, 241 to prevent any rotational movement of the first and second knee components. This allows the patient to lock the knee in full extension in the upright position if needed or desired. Certain prosthesis recipients feel more comfortable walking with the artificial knee locked in that position. The locked position may be used to initially hold the components in the upright position during shipping or prior to installation on a patient. And as the knee components are preferably plastic, metal sleeves 142, 242, 245, which are similar to but shorter than metal sleeve 145 shown in FIGS. 6 and 7, can first be inserted into the locking holes 140, 240, 241 to prevent the rod, pin or fastener from contacting the plastic material of the knee components. Sleeve 145 resides separately in locking hole 140, while sleeves 242, 245 reside separately in locking holes 240, 241 in the side walls 207, 209 of the second knee component 200 so that when the locking holes 140, 240, 241 do not include a rod, pin or fastener, the knee components are free to rotate relative to each other.

Figure 24:
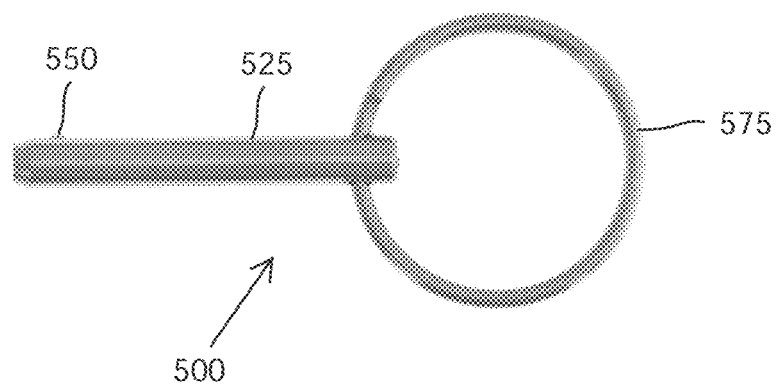
FIG. 24 is a side view of a preferred locking member for the artificial knee of the invention.

A preferred locking member 500 is shown in FIG. 24. This locking member 500 is in the form of a clevis pin having an elongated body 525, a retractable locking ball 550 and a ring pull 575. This locking member is simply inserted into the locking holes 140, 240, 241 wherein the locking ball holds the pin securely therein. When the clevis pin is to be removed, the wearer or a worker assembling the leg on a patient can simply grasp the ring pull 575 to extricate the pin from the locking holes.

The invention also relates to a prosthetic leg comprising some or preferably all of the following components:
 the artificial knee as described herein including the first and second knee components 100, 200 and biasing member 25;
 a fastener 15 to rotatably connect the first and second knee components;
 first and second pylons 30, 60 as described herein;
 a socket support 20;
 a second connector 80 associated with the second pylon 60 and including a cylindrical body 84 and a connector plate 86; and
 a foot component 90 associated with the connector plate 86 of the second connector 80.

Figure 17:
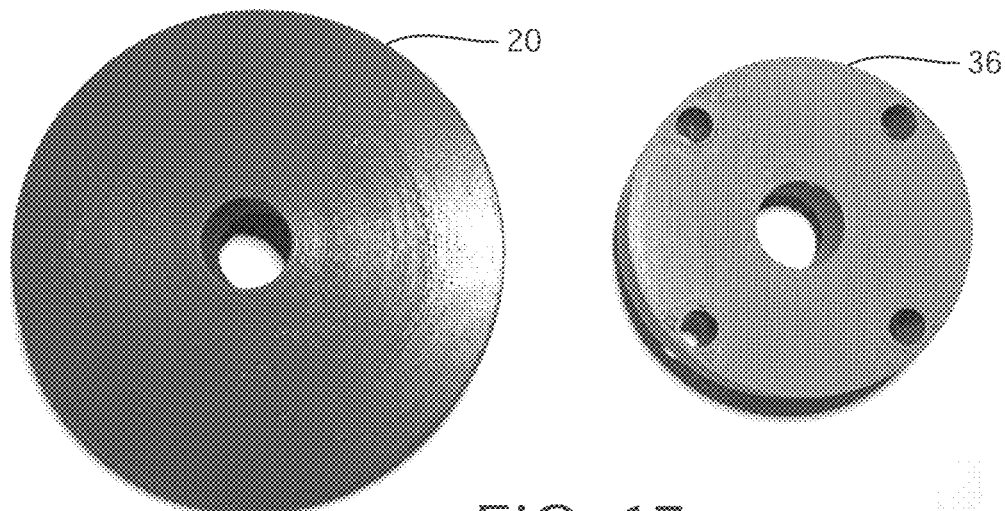
FIG. 17 is a top view of a socket support and connector plate therefor.
Figure 18:
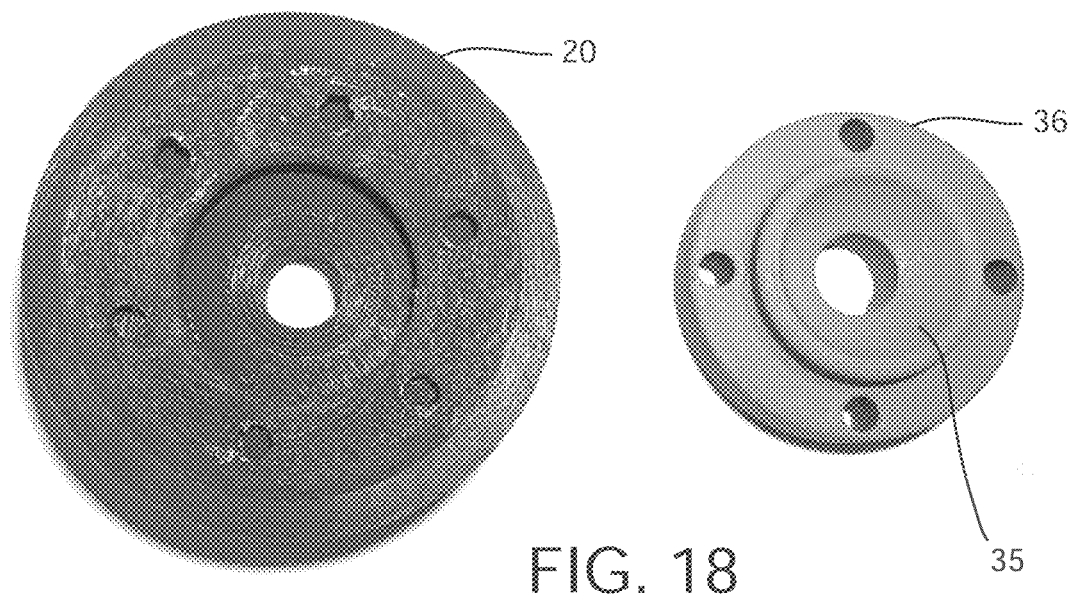
FIG. 18 is a bottom view of the socket support and connector plate of FIG. 17.
Figure 19:
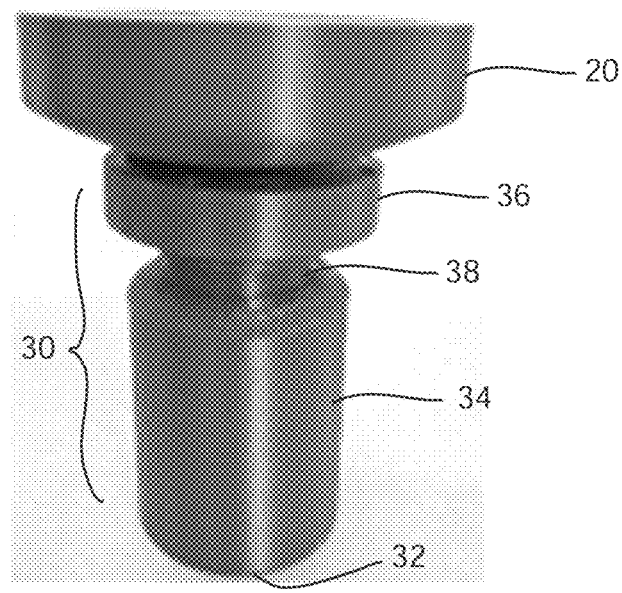
FIG. 19 is a side view of a socket support and associated connector that includes a cylindrical body along with the connector plate shown in FIGS. 17 and 18.
Figure 20:
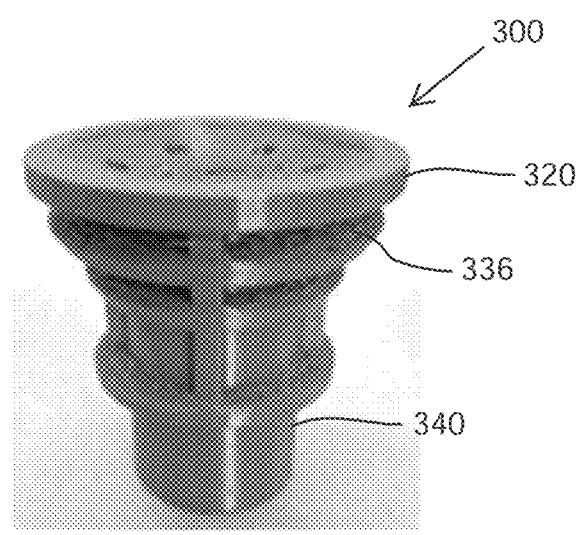
FIG. 20 is a side view of an alternative one-piece socket support plate and connector which can be used in lieu of the three-piece socket support and connector of FIG. 19.
Figure 21:
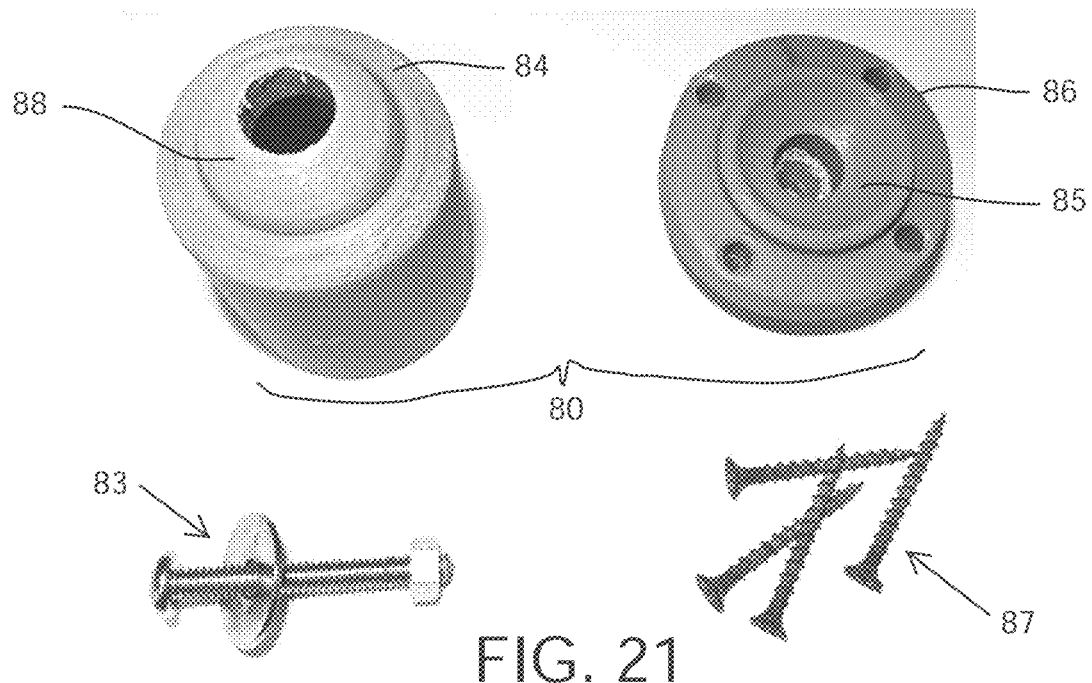
FIG. 21 is a top view of the components of an artificial foot connector.
Figure 22:
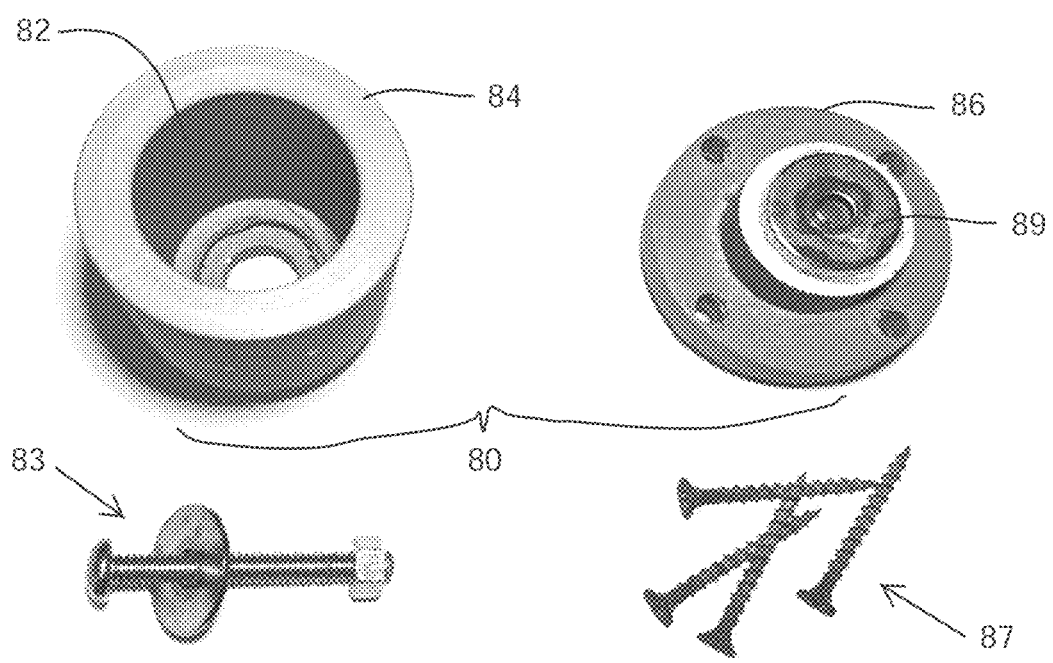
FIG. 22 is a bottom view of the components of the artificial foot connector of FIG. 21.

The additional components mentioned above are best shown in FIGS. 18-23. FIGS. 17-19 illustrate the socket support 20 and its associated connector 30, while FIGS. 21-22 illustrate the artificial foot 90 and its associated connector 80. FIGS. 20 and 22 disclose alternative socket support connectors that can be used instead of the socket support and connector components shown in FIGS. 18-23.

The two connectors 30, 80 shown in FIGS. 17-19 and 21-22 have the same construction. The cylindrical body 34, 84 of each connector 30, 80 includes a central opening 32, 82 at one end to receive the respective pylon 30, 60 and a rounded protrusion 38, 88 at the other end. The connector plates 36, 86 each include an arcuate recess 35, 85 on one side to receive the rounded protrusion for adjustably positioning the pylon with respect to the socket support or foot component. In FIGS. 17-19, the socket support 20 is attached to the connector plate 34 by screws or an adhesive. The cylindrical bodies 34, 84 of each connector are the same, as are the connector plates 36, 86. This simplifies the number of components needed for the kit. If desired, color coding can be used to differentiate the components that are to be used for the different connectors 30, 80. For example, the socket support 20 and connector 30 can be made of one color while connector 80 can be made of a different color. This assists the worker who is assembling the leg on a patient.

FIG. 20 illustrates a one-piece connector 300 that includes the socket support 320, connecting plate 336 and cylindrical body 334. The body 334 includes a central opening 30 at one end to receive the respective pylon 40 but this connector 300 it is not adjustable. This is acceptable since the foot connector 80 remains to adjust any necessary alignments with the artificial foot 90. This connector 300, like the other parts 20, 34, 36, 84, 86 can all be made by 3-D printing. This simplifies the construction of the artificial leg as there is only one component 300 to attach to the socket materials that are provided on the patient's stump.

Figure 23:
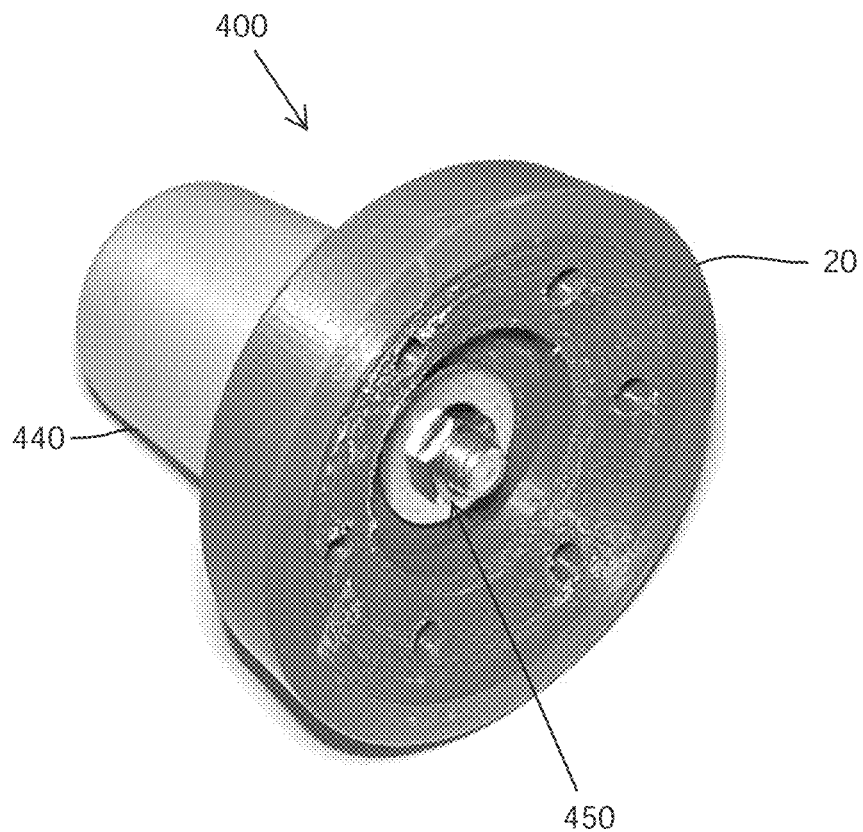
FIG. 23 is a view of a support plate/pylon combination for alternative use with the first knee component in lieu of the three-piece socket support and connector of FIG. 19.

FIG. 23 illustrates another alternative way to associate the socket support 20 with the first knee component so that adjustments can be made to the attachment of the socket support 20 to the casting or other structures that are provided on the patient's thigh. Essentially, the socket support 20 is simply associated with and adjustably attached directly to a shorter first pylon. This is typically used when the patient's stump is relatively long, such as when an amputation has been made in a location that is above but relatively close to the patient's knee. For this embodiment, a shorter pylon is needed and there is not enough room to accommodate connector 30 or connector 300. The different connection member 400 of this embodiment is made by attaching socket support 20 directly to a shorter pylon 440 by the use of a bolt, nut and washer arrangement 450, similar to that shown in FIGS. 21 and 22. The pylon 440 is provided with a central hole that is of a sufficient diameter to accommodate the bolt. The socket support 20, which has a wider diameter hole than the bolt, can slide or move to adjustably position the pylon with respect to the socket support depending upon the specific needs of the patient. After the necessary adjustment is made, the bolt can be tightened to hold the connection member 400 in the desired and adjusted position.

Figure 16:
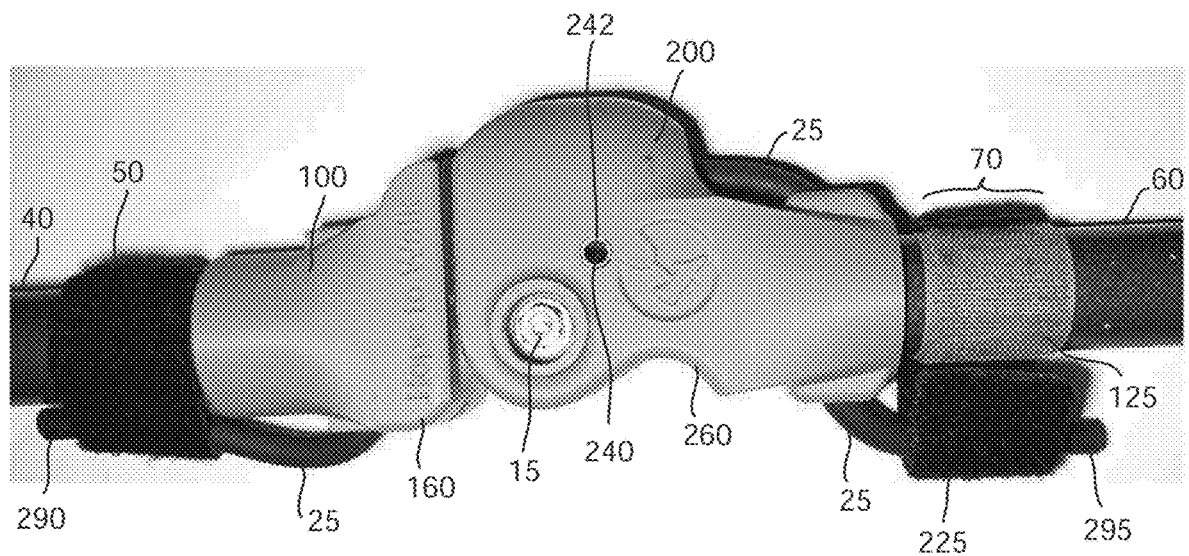
FIG. 16 is a side view of the artificial knee of FIG. 14 with the biasing member almost completely attached.

Thereafter, the socket support 30 is more securely attached to the pylon 440 by wrapping those components with fiberglass that is saturated with a thermosetting adhesive, such as a two-part epoxy where the two parts are mixed before being applied to the fiberglass mat that is wrapped around the socket support 20 and pylon 440. After the adhesive completely sets, a hole is drilled through the lower end of the pylon 440 to form bore 45 through which end 125 of the biasing member 25 can pass before being secured to pylon 440 in essentially the same way as shown in FIGS. 14-16. The biasing member 25 thus secures the pylon 440 to first knee component 200. And while the drilling of bore 45 will also drill through the bolt, nut and washer arrangement 450, this is of no concern as the fiberglass/epoxy adhesive will hold the components in the correctly adjusted orientation. It is also possible to utilize a plastic bolt, nut and washer arrangement to facilitate drilling of bore 45 in pylon 440.

The cylindrical body 34, 84 of each connector 30, 80 is secured to the connector plate 36, 86 by a bolt, nut and washer assembly 83 as shown in FIGS. 21-22. The same assembly is used for the connector 30 of FIG. 19. The cylindrical body 34, 84 of each connector 30, 80 enables the position of the socket 20 or foot 90 to be adjusted prior to completing the assembly of the prosthetic leg. The foot adjustment is generally more important, such that connector 80 allows for adjusting of the pylon to the foot to compensate for variations in that individual's legs or posture such as a little scoliosis or similar conditions. As noted, the socket support 20 is used for attaching to the socket (or thigh cup) of the patient and connector 30 allows for further adjustment when needed.

After the patient's alignments are fixed, the cylindrical bodies 34, 84 and plates 36, 86 of the first and second connectors 30, 80 are bolted into place at the adjusted angles and then are secured together typically using an epoxy or other adhesive. And after the appropriate thigh adjustments are made, the socket support and associated connector 30 are affixed in place with fiberglass and a thermosetting adhesive such as an epoxy as described previously. This fixes the position of the cylindrical bodies of the connectors to the connector plates after being adjustably positioned thereon. As the bolting is only used for temporarily holding the components in the adjusted position, plastic bolting can be used instead of metal.

The invention also relates to a kit for assembling a prosthetic leg. This kit includes the previously described components of the artificial knee, biasing member, fastener, first and second pylons, and artificial foot component.

One embodiment of the kit further includes the first connector associated with the first pylon and including a cylindrical body and a connector plate; the socket support associated with the connector plate of the first connector; and the second connector associated with the second pylon and including a cylindrical body and a connector plate, with the connector plate configured for attachment to the foot component.

Another embodiment of the kit further includes a socket support associated with and adjustably attached directly to the first pylon for adjustably positioning the first pylon with respect to the socket support; and a second connector associated with the second pylon and including a cylindrical body and a connector plate, with the connector plate configured for attachment to the foot component.

Other features of the components that are typically attached to a person's stump are disclosed in the kits disclosed in U.S. Pat. No. 10,376,390 and U.S. patent application Ser. No. 16/538,751, the entire content of each of which is expressly incorporated herein by reference thereto. This includes the parts that are placed on the patient before attaching the socket support thereto.

All of the necessary components described above are provided in a box or other enclosure along with any other common components such as fasteners, adhesives, instructions, etc. so that the recipient of the box has all of the necessary parts and information to assemble the leg prothesis. The kit also typically includes fasteners for connecting the connector body and connector plate of each connector; fasteners for attaching the connector plate of the first connector to the socket support; and fasteners for attaching the connector plate of the second connector to the foot component. Also, appropriate adhesives, which generally are thermosetting adhesives, along with fiberglass reinforcement are also included in the kits.

As shown in FIGS. 21-22, screws 87 are typically used to attach the connector plate 86 to the artificial foot 90. The back side of the connector plate 86 includes a cylindrical protrusion 89 that is configured to fit in a cylindrical hole in the artificial foot 90. Then the screw 87 can be used to secure the connector plate to the foot 90. As noted above, the fastener assembly 83 connects the plate 85 to the cylindrical body 84. After the alignment is completed, the bolt is tightened to hold the components together and a thermosetting adhesive such as an epoxy is applied with fiberglass reinforcement to fix those components permanently in the adjusted position.

Finally, the invention also relates to a method for preparing a prosthetic leg from the previously described kit for a person having a missing leg and a remaining thigh stump. This method comprises:
- providing a fabric or cloth sock on the person's stump;
- providing a plastic bag or plastic film (e.g., Saran® wrap) on the fabric or cloth sock;
- providing a casting sock on the person's stump;
- activating the casting sock by immersion in water and applying the activated casting sock over the plastic film or bag;
- allowing the casting sock to cure or set to a final rigid shape;
- providing the socket support beneath the casting sock;
- joining the socket support to the casting sock with an adhesive, such as an epoxy adhesive that contacts a base of the rigid casting sock below the end of the person's arm stump;
- wrapping the socket support and rigid casting sock with casting tape that has been activated by immersion in water and allowing the wrapped components to set and cure to a solid;
- cutting the first and second pylons to appropriate lengths so that the prosthetic leg provides the correct height for the person, i.e., approximating the anatomical knee and leg of the person e.g., by comparison to the existing opposite leg;
- attaching one end of the first pylon to the first knee component of the artificial knee and attaching the other end of the first pylon to the socket support; and
- attaching one end of the second pylon to the second knee component of the artificial knee and the other end of the second pylon to a hole in the artificial foot.

This method further comprises securing first and second end portions of the biasing member to the pylons to hold the biasing member in place and further secure the pylons to the knee components, wherein the first end portion of the biasing member extends from the second aperture of the terminal end of the first knee component and the second end portion of the biasing member extends from the first aperture of the terminal end of the second knee component, and wherein the end portions of the biasing members are secured to the pylons using bands of hook and loop fasteners wherein one of the bands is secured to the pylon and the other band engages the secured band with the biasing member end located therebetween.

In one embodiment of the method, also provided are a first connector associated with the first pylon and including a cylindrical body and a connector plate and a second connector associated with the second pylon and including a cylindrical body and a connector plate, with the connector plate of the second connector configured for attachment to the foot component. In this embodiment, the method further comprises attaching one end of the first pylon to the opening on the lower surface of the first connector and the other end of the first pylon to the first knee component of the artificial knee; and attaching one end of the second pylon to the second knee component of the artificial knee and the other end of the second pylon to a hole in the artificial foot using the second connector. The pylons are typically attached to the connectors by an adhesive e.g., an epoxy, or by appropriate hardware e.g., screws, as desired or necessary.

The artificial knee of the present invention thus provides a lightweight, versatile, low-cost device that can assist individuals that have lost a leg. Providing the components for the leg in a kit enables a worker to readily receive everything necessary to assemble the leg on a patient. And the novel and useful methods disclosed herein provides steps that facilitate the quick and effective assembly of the leg on the patient.

It is to be understood that additional embodiments of the present invention described herein may be contemplated by one of ordinary skill in the art and that the scope of the present invention is not limited to the specific and preferred embodiments that are disclosed. While specific embodiments of the present invention have been illustrated and described, numerous modifications come to mind to a skilled artisan without significantly departing from the spirit of the invention, and the scope of protection is limited only by the scope of the accompanying claims and equivalents thereof.

What is claimed is:

1. An artificial knee comprising:
   - first and second knee components connected together for rotation between an upright position and one or more rotated positions, wherein the first knee component has a first end configured for receiving a rod member and a second end that includes an extension member located in a generally central location of that end, and wherein the second knee component comprises a cylindrical member having a first end configured for receiving a rod member and a second end that includes a slot formed by a pair of side walls surrounding a U-shaped recess, with the slot being generally centrally located between the side walls and configured and dimensioned to allow the extension member of the first knee component to rotate therein, such that rotation of the knee components is achieved as the extension member rotates in the slot between the upright and rotated positions;
   - a fastener for connecting together the first and second knee components, wherein the fastener passes through the side walls and slot of the second knee component and through the extension member of the first knee component to facilitate rotation of the knee components; and
   - a biasing member comprising a flexible rod or tube of an elastomeric material operatively associated with the first and second knee components for urging those components towards the upright position, such that rotation of the second knee component toward a rotated position stretches or elongates the biasing member to provide a force that urges the knee components towards the upright position when one or both knee components are rotated.

2. The artificial knee of claim 1 wherein each knee component is made of plastic material, the biasing member is a flexible, solid, natural rubber rod or cord, the fastener is a bolt and nut arrangement, the holes in the side walls and extension member include a metal sleeve to prevent contact of the fastener with the plastic material of the knee components, and the slot includes an opening that allows the biasing member to pass therethrough.

3. The artificial knee of claim 1 further comprising one or more contact portions associated with each knee component and configured for surface-to-surface contact when the knee components are in the upright position with the one or more contact portions also acting as a stop member to prevent rotation of the knee components past the upright position.

4. The artificial knee of claim 3 wherein two contact portions are present on each of the first and second knee components and each contact portions on the second knee component includes a dampening member made of a flexible elastomeric or polyurethane pad.

5. The artificial knee of claim 1 wherein the first knee component comprises at least one protrusion and the second knee component comprises a recess for receiving the at least one protrusion wherein contact between the protrusion(s) and recess prevent further rotational movement of the knee components beyond a rotated position of about 135 degrees from the upright position.

6. The artificial knee of claim 1 further comprising a locking member positioned in holes in the first and second knee components for retaining the knee components in the upright position.

7. The artificial knee of claim 1 wherein the first end of each knee component includes a central opening for receiving the rod member and first and second apertures arranged transversely to and providing side access to the central opening; wherein the biasing member passes through the apertures of the terminal end of the first knee component, alongside the extension member of the first knee component, through the slot of the second knee component, and through the apertures of the terminal end of the second knee component.

8. The artificial knee of claim 7 further comprising first and second pylons, with the first pylon associated with the first knee component and the second pylon associated with the second knee component, wherein the central opening of the first end of each knee component is configured for receiving an end of its associated pylon therein, wherein each pylon is configured with a transverse bore which aligns with the first and second apertures in the opening of the terminal end of the knee component, and wherein the biasing member also passes through the transverse bores of the pylons to help secure the pylons to the knee components.

9. The artificial knee of claim 8 wherein each central opening and pylon have a cylindrical configuration, and each pylon comprises a wood dowel surrounded by a plastic conduit.

10. The artificial knee of claim 8 wherein the biasing member includes first and second end portions that are used to secure the biasing member to the pylons to hold the biasing member in place and to further secure the pylons to the knee components, wherein the first end portion of the biasing member extends from the second aperture of the terminal end of the first knee component and the second end portion of the biasing member extends from the first aperture of the terminal end of the second knee component.

11. The artificial knee of claim 10 wherein the biasing member is a flexible, solid, natural rubber rod or cord and the end portions of the biasing member and wherein each end portion of the biasing member includes a knot which prevents the end portions from retracting into the apertures of the terminal ends of the knee components.

12. The artificial knee of claim 10 wherein the biasing member is a flexible, solid, natural rubber rod or cord and the end portions of the biasing member are secured to the pylons using bands of hook and loop fasteners wherein one of the bands is secured to the pylon and the other band engages the secured band with the end of the biasing member held between the bands.

13. The artificial knee of claim 8 further comprising a socket support associated with and adjustably attached directly to the first pylon, wherein each central opening and pylon have a cylindrical configuration, and each pylon comprises a wood dowel surrounded by a plastic conduit.

14. A prosthetic leg comprising the following components:
the artificial knee of claim 1 including the biasing member;
first and second pylons, with the first pylon associated with the first knee component and the second pylon associated with the second knee component, wherein the central opening of the first end of each knee component is configured for receiving an end of its associated pylon therein; and
an artificial foot component.

15. The prosthetic leg of claim 14 further comprising:
a first connector associated with the first pylon and including a cylindrical body and a connector plate;
a socket support associated with the connector plate of the first connector; and
a second connector associated with the second pylon and including a cylindrical body and a connector plate, with the connector plate configured for attachment to the foot component.

16. The prosthetic leg of claim 15 wherein the cylindrical body of each connector includes a central opening at one end to receive the pylon and a rounded protrusion at the other end, with the connector plate including an arcuate recess on one side to receive the rounded protrusion for adjustably positioning the pylon with respect to the socket support or foot component.

17. The prosthetic leg of claim 16 wherein the cylindrical body of each connector is secured to its respective connector plate by a bolt, nut and washer assembly, with the cylindrical body of each connector further affixed to its respective connector plate by an adhesive after being adjustably positioned thereon; wherein the first end of each knee component includes a central opening for receiving the rod member and first and second apertures arranged transversely to and providing side access to the central opening; and further wherein each pylon is configured with a transverse bore which aligns with the first and second apertures in the first end of each knee component, and the biasing member passes through the transverse bores of the pylons to help secure the pylons to the knee components.

18. A kit for assembling a prosthetic leg comprising the components of the artificial knee, biasing member, fastener, and first and second pylons as recited in claim 14.

19. A kit for assembling a prosthetic leg comprising the components of the artificial knee, biasing member, fastener, first and second pylons, first connector, socket support, second connector, and artificial foot component as recited in claim 17.

20. A method for preparing a prosthetic leg from the kit of claim 14 for a person having a missing leg and a remaining thigh stump, which comprises:
providing a fabric or cloth sock on the person's stump;
providing a plastic bag or plastic film on the fabric or cloth sock;
providing a casting sock on the person's stump;
activating the casting sock by immersion in water and applying the activated casting sock over the plastic film or bag;
allowing the casting sock to cure or set to a final rigid shape;
providing a socket support beneath the casting sock;

joining the socket support to the casting sock with an adhesive;

wrapping the socket support and rigid casting sock with casting tape that has been activated by immersion in water and allowing the wrapped components to set and cure to a solid;

cutting the first and second pylons to appropriate lengths so that the prosthetic leg matches the anatomical leg of the person;

attaching one end of the first pylon to the first knee component of the artificial knee and attaching the other end of the first pylon to the socket support; and attaching one end of the second pylon to the second knee component of the artificial knee and the other end of the second pylon to a hole in the artificial foot.

* * * * *